(12) United States Patent
Baker et al.

(10) Patent No.: US 7,964,020 B2
(45) Date of Patent: Jun. 21, 2011

(54) GAS SEPARATION PROCESS USING MEMBRANES WITH PERMEATE SWEEP TO REMOVE CO₂ FROM COMBUSTION GASES

(75) Inventors: Richard W Baker, Palo Alto, CA (US); Johannes G Wijmans, Menlo Park, CA (US); Timothy C Merkel, Menlo Park, CA (US); Haiqing Lin, Mountain View, CA (US); Ramin Daniels, San Jose, CA (US); Scott Thompson, Brecksville, OH (US)

(73) Assignee: Membrane Technology & Research, Inc, Menlo Park, CA (US)

( * ) Notice: Subject to any disclaimer, the term of this patent is extended or adjusted under 35 U.S.C. 154(b) by 0 days.

(21) Appl. No.: 12/734,941

(22) PCT Filed: May 8, 2009

(86) PCT No.: PCT/US2009/002874
§ 371 (c)(1),
(2), (4) Date: Jun. 2, 2010

(87) PCT Pub. No.: WO2009/139835
PCT Pub. Date: Nov. 19, 2009

(65) Prior Publication Data
US 2010/0236404 A1    Sep. 23, 2010

Related U.S. Application Data

(60) Provisional application No. 61/127,415, filed on May 12, 2008.

(51) Int. Cl.
*B01D 53/22* (2006.01)

(52) U.S. Cl. ............... 95/51; 95/46; 95/139; 95/236; 96/4; 96/9; 62/606; 62/624; 60/274; 60/278

(58) Field of Classification Search ............ 95/45, 46, 95/51, 130, 138, 139, 236; 96/4, 7, 9, 134; 62/600, 606, 624; 60/273, 274, 278
See application file for complete search history.

(56) References Cited

U.S. PATENT DOCUMENTS

| | | | |
|---|---|---|---|
| 4,639,257 A * | 1/1987 | Duckett et al. | 95/51 |
| 4,659,343 A * | 4/1987 | Kelly | 95/46 |
| 4,931,070 A | 6/1990 | Prasad | |
| 5,240,471 A | 8/1993 | Barbe et al. | |
| 5,500,036 A * | 3/1996 | Kalthod | 95/54 |
| 5,641,337 A | 6/1997 | Arrowsmith et al. | |
| 5,681,433 A | 10/1997 | Friesen et al. | |
| 5,843,209 A | 12/1998 | Ray et al. | |
| 6,228,145 B1 * | 5/2001 | Falk-Pedersen et al. | 95/44 |
| 6,478,852 B1 | 11/2002 | Callaghan et al. | |
| 7,625,427 B2 * | 12/2009 | Clarke et al. | 95/51 |

(Continued)

OTHER PUBLICATIONS

US 4,981,498, 01/1991, Bikson et al. (withdrawn)

*Primary Examiner* — Jason M Greene
(74) *Attorney, Agent, or Firm* — J. Farrant; K. Bean (57) ABSTRACT

A gas separation process for treating flue gases from combustion processes, and combustion processes including such gas separation. The invention involves flowing the flue gas stream to be treated across the feed side of a membrane, flowing a sweep gas stream, usually air, across the permeate side, then passing the permeate/sweep gas to the combustor.

20 Claims, 4 Drawing Sheets

U.S. PATENT DOCUMENTS

| | | |
|---|---|---|
| 7,713,332 B2* | 5/2010 | Bronold ............................ 95/51 |
| 7,763,097 B2* | 7/2010 | Federspiel et al. ................ 95/51 |
| 2008/0011161 A1* | 1/2008 | Finkenrath et al. ................. 96/4 |
| 2008/0127632 A1* | 6/2008 | Finkenrath et al. ............ 60/274 |
| 2008/0176174 A1* | 7/2008 | White et al. ...................... 431/5 |
| 2009/0232861 A1* | 9/2009 | Wright et al. .................... 95/51 |
| 2010/0251887 A1* | 10/2010 | Jain .................................. 95/46 |

* cited by examiner

GAS SEPARATION PROCESS USING MEMBRANES WITH PERMEATE SWEEP TO REMOVE CO$_2$ FROM COMBUSTION GASES

This application claims the benefit of U.S. Provisional Application Ser. No. 61/127,415, filed May 12, 2008 and PCT Application No. PCT/US09/02874, filed May 8, 2009, both of which applications are hereby incorporated herein by reference in their entireties.

FIELD OF THE INVENTION

The invention relates to membrane-based gas separation processes, and specifically to processes using a sweep gas on the permeate side of the membranes to remove carbon dioxide from combustion gases.

BACKGROUND OF THE INVENTION

Many combustion processes produce flue gases contaminated with carbon dioxide that contribute to global warming and environmental damage.

Such gas streams are difficult to treat in ways that are both technically and economically practical, and there remains a need for better treatment techniques.

Gas separation by means of membranes is a well established technology. In an industrial setting, a total pressure difference is usually applied between the feed and permeate sides, typically by compressing the feed stream or maintaining the permeate side of the membrane under partial vacuum.

It is known in the literature that a driving force for transmembrane permeation may be supplied by passing a sweep gas across the permeate side of the membranes, thereby lowering the partial pressure of a desired permeant on that side to a level below its partial pressure on the feed side. In this case, the total pressure on both sides of the membrane may be the same, the total pressure on the permeate side may be higher than on the feed side, or there may be additional driving force provided by keeping the total feed pressure higher than the total permeate pressure.

Using a sweep gas has most commonly been proposed in connection with air separation to make nitrogen or oxygen-enriched air, or with dehydration. Examples of patents that teach the use of a sweep gas on the permeate side to facilitate air separation include U.S. Pat. Nos. 5,240,471; 5,500,036; and 6,478,852. Examples of patents that teach the use of a sweep gas in a dehydration process include U.S. Pat. Nos. 4,931,070; 4,981,498 and 5,641,337.

Configuring the flow path within the membrane module so that the feed gas and sweep stream flow, as far as possible, countercurrent to each other is also known, and taught, for example in U.S. Pat. Nos. 5,681,433 and 5,843,209.

SUMMARY OF THE INVENTION

The invention is a process involving membrane-based gas separation for controlling carbon dioxide emissions from combustion processes, and combustion processes in which carbon dioxide emissions are so controlled.

Combustion exhaust streams or off-gases are typically referred to as flue gas, and arise in large quantities from ovens, furnaces and boilers in all sectors of industry. In particular, power plants generate enormous amounts of flue gas. A modestly sized 100 megawatt coal-based power plant may produce over 300 MMscfd of flue gas.

The major components of combustion exhaust gases are normally nitrogen, carbon dioxide and water vapor. Other components that may be present, typically only in small amounts, include oxygen, hydrogen, SO$_x$, NO$_x$, and unburnt hydrocarbons. The carbon dioxide concentration in the flue gas is generally up to about 20 vol %.

In addition to gaseous components, combustion flue gas contains suspended particulate matter in the form of fly ash and soot. This material is usually removed by several stages of filtration before the gas is sent to the stack. It is assumed herein that the flue gas has already been treated in this way prior to carrying out the processes of the invention.

The process of the invention involves treating the filtered exhaust gas to remove carbon dioxide. In preferred embodiments, the carbon dioxide level of the exhaust gas is reduced to as low as 5 vol % or less, and most preferably to 3 vol % or less. Discharge of such a stream to the environment is much less damaging than discharge of the untreated exhaust.

The combustion process from which the exhaust is drawn may be of any type. The fuel may be a fossil fuel, such as coal, oil or natural gas, or may be from any other source, such as landfill gas, biomass, or other combustible waste. The fuel may be combusted by mixing with air, oxygen-enriched air or pure oxygen.

After the combustion step itself, the flue gas is first subjected to a carbon dioxide capture step. This capture step removes a portion of the carbon dioxide from the emissions stream, and preferably provides it in the form of a concentrated stream, such as greater than 60, 70 or 80 vol % carbon dioxide, and most preferably as a supercritical fluid or liquid high purity product. The concentrated product stream may be sent for sequestration, or for any other use.

The capture step may utilize any separation technology suitable for recovering carbon dioxide from a stream of the exhaust gas concentration. Preferred technologies are absorption, such as amine scrubbing or chilled ammonia sorption, membrane separation, and condensation.

The off-gas stream from the capture step still contains carbon dioxide, but normally at a lower concentration than the raw exhaust stream. Typically, this concentration is up to about 10 vol % carbon dioxide.

The off-gas stream is sent for treatment in a membrane separation unit. The unit contains membranes selectively permeable to carbon dioxide over nitrogen and to carbon dioxide over oxygen. It is preferred that the membrane provide a carbon dioxide permeance of at least about 300 gpu, more preferably at least about 500 gpu and most preferably at least about 1,000 gpu under the operating conditions of the process. A carbon dioxide/nitrogen selectivity of at least about 10 or more preferably 20 under the operating conditions of the process is also desirable.

The off-gas flows across the feed side of the membranes, and a sweep gas of air, oxygen-enriched air or oxygen flows across the permeate side, to provide or augment the driving force for transmembrane permeation. The sweep stream picks up the preferentially permeating carbon dioxide. The sweep/permeate stream is then withdrawn from the membrane unit and is returned to the combustor to form at least part of the air, oxygen-enriched air or oxygen feed to the combustion step.

By using the oxygen-containing stream destined for the combustor as sweep gas, the membrane separation step is carried out in a very efficient manner, and without introducing any additional unwanted components into the combustion zone.

The process is particularly useful in applications that are energy-sensitive, as is almost always the case when the very large streams from power plants and the like are to be processed.

The process is also particularly useful in separations that are pressure-ratio limited, as will be explained in more detail below.

The membrane separation step may be carried out using one or more individual membrane modules. Any modules capable of operating under permeate sweep conditions may be used. Preferably, the modules take the form of hollow-fiber modules, plate-and-frame modules, or spiral-wound modules. All three module types are known, and their configuration and operation in sweep, including counterflow sweep modes, is described in the literature.

The process may use one membrane module, but in most cases, the separation will use multiple membrane modules arranged in series or parallel flow arrangements as is well known in the art. Any number of membrane modules may be used.

The process may be augmented by operating the membrane unit with higher total pressure on the feed side than on the permeate side, thereby increasing the transmembrane driving force for permeation.

It is highly preferred that the feed gas flow direction across the membrane on the feed side and the sweep gas flow direction across the membrane on the permeate side are substantially countercurrent to each other. In the alternative, the relative flow directions may be substantially crosscurrent, or less preferred, cocurrent.

The residue stream is reduced in carbon dioxide content to less than about 5 vol %, more preferably to less than 3 vol % and most preferably to less than 2 vol %. This stream is typically, although not necessarily, discharged to the environment. The reduction of the carbon dioxide content to 20%, 10% or less of the content in the raw exhaust greatly reduces the environmental impact of discharging the stream.

The invention in a basic embodiment includes three steps: a combustion step, a carbon dioxide capture step, and a sweep-based membrane separation step, operated according to following basic flow scheme:
(a) performing a combustion process by combusting a mixture of a fuel and air, oxygen-enriched air or oxygen, thereby creating an exhaust stream comprising carbon dioxide and nitrogen;
(b) performing a carbon dioxide capture step to remove a portion of carbon dioxide in concentrated form from the exhaust stream, thereby creating an off-gas stream from the capture step that is less concentrated in carbon dioxide than the exhaust stream;
(c) providing a membrane having a feed side and a permeate side, and being selectively permeable to carbon dioxide over nitrogen and to carbon dioxide over oxygen;
(d) passing at least a portion of the off-gas stream across the feed side;
(e) passing air, oxygen-enriched air or oxygen as a sweep stream across the permeate side;
(f) withdrawing from the feed side a carbon-dioxide depleted vent stream;
(g) withdrawing from the permeate side a permeate stream comprising oxygen and carbon dioxide;
(h) passing the permeate stream to step (a) as at least part of the air, oxygen-enriched air or oxygen used in step (a).

Circulation of the permeate stream to the combustion step is very advantageous, as it helps to build up the carbon dioxide concentration that passes to the carbon dioxide capture step, facilitating good carbon dioxide removal in this step.

In a preferred case, the carbon dioxide capture step also includes a membrane separation step, and the process comprises the following steps:

(a) performing a combustion process by combusting a mixture of a fuel and air, oxygen-enriched air or oxygen, thereby creating an exhaust stream comprising carbon dioxide and nitrogen;
(b) providing a first membrane having a first feed side and a first permeate side, and being selective for carbon dioxide over nitrogen;
(c) maintaining a driving force for transmembrane permeation;
(d) passing at least a portion of the exhaust stream across the first feed side;
(e) withdrawing from the first feed side a first residue stream depleted in carbon dioxide compared with the exhaust stream;
(f) withdrawing from the first permeate side a first permeate stream comprising carbon dioxide;
(g) providing a second membrane having a second feed side and a second permeate side, and being selectively permeable to carbon dioxide over nitrogen and to carbon dioxide over oxygen;
(h) passing at least a portion of the first residue stream across the second feed side;
(i) passing air, oxygen-enriched air or oxygen as a sweep stream across the second permeate side;
(j) withdrawing from the second feed side a carbon-dioxide depleted vent stream;
(k) withdrawing from the second permeate side a second permeate stream comprising oxygen and carbon dioxide;
(l) passing the second permeate stream to step (a) as at least part of the air, oxygen-enriched air or oxygen used in step (a).

In preferred embodiments of this type, the permeate stream from the first membrane separation step can be cooled and compressed to produce a fluid carbon dioxide product for sequestration or use.

The first membrane separation step is typically, but not necessarily, operated as a pressure-driven step, using a compressor to compress the gas entering the feed side of the membrane, a vacuum pump to reduce the pressure on the permeate side of the membrane, or both.

Many membrane materials are very permeable to water vapor, so the first permeate stream tends to contains high concentrations of water vapor, such as 20 vol %, 30 vol % or more. The co-permeation of water with the carbon dioxide is helpful, as the water dilutes the carbon dioxide concentration on the permeate side and helps maintain driving force for transmembrane permeation for carbon dioxide.

Optionally, the beneficial effect of copermeation of water can be maintained or enhanced by adding water vapor to the first membrane feed stream if it is not saturated, or by injecting steam or water vapor between the individual membrane modules, especially towards the residue end of the train of modules.

As another alternative, the driving force in the first membrane separation step may be augmented by using a steam sweep on the permeate side of the membrane.

In all of these cases, the water present in the permeate stream may easily be removed by cooling the stream to condense the water after the permeate stream is withdrawn from the membrane unit.

As mentioned above, the invention is particularly valuable as it relates to the treatment of power plant flue gas. In this aspect, preferred processes incorporate three discrete membrane separation steps: (i) one in the carbon dioxide capture step, operating generally as described above, (ii) an additional membrane separation step operated in conjunction with compression and condensation to recover a liquid or supercritical fluid carbon dioxide product from the carbon dioxide capture step, and (iii) the sweep-based step in which incoming air or oxygen for the combustor is used as sweep gas, also operating in the same general manner as described above.

A representative embodiment of a process of this type for treating such flue gas includes the following steps:
(a) performing a first membrane separation step by;
(i) providing a first membrane unit containing a first membrane having a first feed side and a first permeate side;
(ii) providing a first driving force for transmembrane permeation by maintaining the first permeate side under a partial vacuum;
(iii) passing the flue gas stream across the first feed side;
(iv) withdrawing from the first feed side a carbon-dioxide-depleted first residue stream;
(v) withdrawing from the first permeate side a carbon-dioxide-enriched first permeate stream;
(b) compressing the first permeate stream;
(c) cooling the first permeate stream thereby condensing water to provide a compressed, cooled first permeate stream;
(d) performing on the first permeate stream a combination of a second membrane separation step and a liquefaction step to form a liquid carbon dioxide product, wherein the second membrane separation step is performed by;
(i) providing a second membrane unit containing a second membrane having a second feed side and a second permeate side;
(ii) providing a second driving force for transmembrane permeation;
(iii) withdrawing from the second feed side a carbon-dioxide-depleted second residue stream;
(iv) withdrawing from the second permeate side a carbon-dioxide-enriched second permeate stream;
(e) performing a third membrane separation step by;
(i) providing a third membrane unit containing a third membrane having a third feed side and a third permeate side, and being selectively permeable to carbon dioxide over nitrogen;
(ii) passing at least a portion of the first residue stream across the third feed side;
(iii) passing air as a sweep stream across the third permeate side;
(iv) withdrawing from the third feed side a treated flue gas stream;
(v) withdrawing from the third permeate side a third permeate stream comprising oxygen and carbon dioxide;
(f) using the third permeate stream as an air supply stream for a combustor in the power plant.

The second membrane separation step is typically, but not necessarily, operated as a pressure-driven step, using a compressor to compress the gas entering the feed side of the membrane, a vacuum pump to reduce the pressure on the permeate side of the membrane, or both.

A process using three membrane separation steps in this way can take a flue gas stream containing 5 vol %, 10 vol % 15 vol % or 20 vol % carbon dioxide, for example, and produce only water, liquefied or supercritical fluid carbon dioxide, and a treated flue gas containing just a few percent, such as 4 vol %, 2 vol %, 1 vol % or less of carbon dioxide for discharge.

BRIEF DESCRIPTION OF THE DRAWINGS

FIG. 3 is an embodiment of the invention as it relates to treatment of flue gas from a power plant or the like.

FIG. 4 is an alternative embodiment of the invention as it relates to treatment of flue gas from a power plant or the like.

DETAILED DESCRIPTION OF THE INVENTION

Gas percentages given herein are by volume unless stated otherwise.

Pressures as given herein are in bar absolute unless stated otherwise.

The terms exhaust gas, off-gas and emissions stream are used interchangeably herein.

The invention is a process for controlling carbon dioxide emissions from combustion processes by membrane-based gas separation, and combustion processes including such gas separation.

Figure 1:
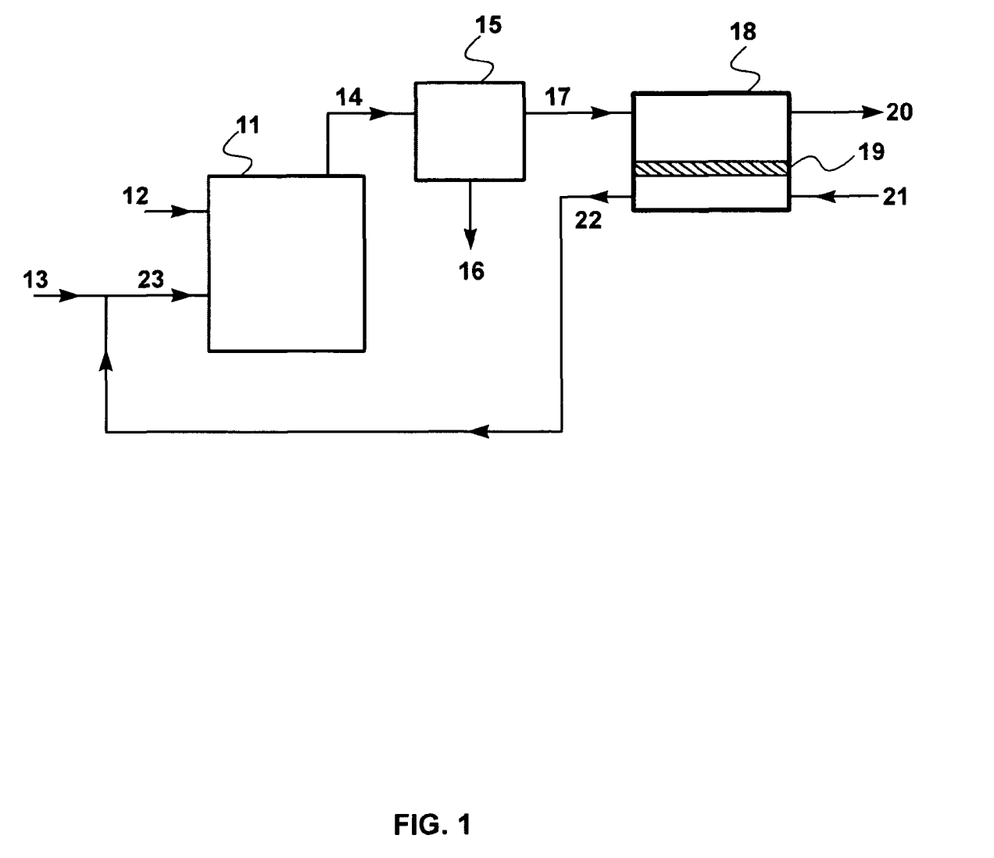
FIG. 1 is a schematic drawing of a flow scheme for a basic embodiment of the invention as it relates to a typical combustion process.

A simple flow scheme for a basic embodiment of the invention is shown in FIG. 1. Referring to this figure, fuel stream 12, and air, oxygen-enriched air or oxygen stream 23, are introduced into a combustion step or zone, 11. Stream 23 is made up of sweep stream, 22, discussed below, and additional air or oxygen supply, stream 13.

Combustion exhaust stream, 14, typically containing 10-20 vol % carbon dioxide, is withdrawn. This stream usually contains at least carbon dioxide, water vapor and nitrogen, as well as the other components mentioned in the Summary section above.

The stream is sent, at least in part, to carbon dioxide capture step, 15. This step may be carried out using any technology or combination of technologies that can create a concentrated carbon dioxide stream from the exhaust stream.

The capture step yields a concentrated carbon dioxide product stream, 16, preferably containing greater than 60, 70, or 80 vol % carbon dioxide or more. This stream may be in the gas or liquid phase, and may comprise purified liquid carbon dioxide, for example. The concentrated stream may be sent for sequestration, or used or disposed of in any other appropriate way.

The off-gas stream, 17, from the capture step still contains carbon dioxide, at a lower concentration than the raw exhaust stream. Typically, but not necessarily, this concentration is up to about 10 vol % carbon dioxide for coal-fired boilers, lower for gas-fired boilers. The off-gas stream is sent for treatment in membrane separation step or unit, 18. The unit contains membranes, 19, that are selectively permeable to carbon dioxide over nitrogen and to carbon dioxide over oxygen.

The off-gas flows across the feed side of the membranes; a sweep gas of air, oxygen-enriched air or oxygen, stream 21, flows across the permeate side.

The sweep stream picks up the preferentially permeating carbon dioxide, and the resulting permeate stream, 22, is withdrawn from the membrane unit and is combined with stream 13 to form the air or oxygen feed, 23, to the combustor.

In the alternative, stream 13 may be omitted and the entirety of the oxygen-containing feed to the combustor may be provided by the sweep stream.

The residue stream, 20, is reduced in carbon dioxide content to less than about 5 vol %, more preferably to less than 3 vol % and most preferably to less than 2 vol %. Typically, this stream is discharged to the environment One of the additional beneficial consequences of using the combustion air or oxygen supply as the permeate sweep is that the permeating carbon dioxide removed into the sweep gas is recycled to the combustion chamber. This increases the carbon dioxide concentration in the exhaust gas leaving the combustor, facilitating the downstream capture of carbon dioxide.

For example, conventional combustion of coal with air usually produces an off-gas containing 10-12% carbon dioxide, whereas returning carbon dioxide to the combustion chamber in accordance with the teachings herein can increase the off-gas concentration to about 15 or 20 vol %.

From FIG. 1, it may be seen that the process of the invention incorporates three unit operations: a combustion step, a carbon capture step and a final membrane separation step, in that order.

The combustion step may be carried out in any way limited only in that it results in an off-gas, exhaust gas or flue gas containing carbon dioxide. Such combustion processes occur throughout industrialized society. Representative processes include those in which the combustion step is used to provide heat for an oven or furnace, such as a blast furnace. Other important processes are those in which the combustion step is used to generate steam to operate a turbine or other equipment to perform mechanical work or generate electric power. In yet other processes, the combustion gases themselves are used as a source of power to drive a turbine or the like, and may be treated before or after they have been used in the turbine.

The fuel for the combustion step may be any fuel that can be combusted with oxygen, including, but not limited to, coal, coke, wood, biomass, solid wastes, oils and other natural and synthetic liquid fuels of all grades and types, and hydrocarbon-containing gas of any type, such as natural gas, landfill gas, coal mine gas or the like.

The oxygen with which the fuel is combusted may be supplied in the form of high purity oxygen, oxygen-enriched air, normal air or any other suitable oxygen-containing mixture.

The carbon capture step may be carried out using membrane or non-membrane technology, and may involve one or more than one type of separation procedure. In the event that membrane technology is used in whole or part for this step, the capture step remains a discrete unit operation separate from the subsequent membrane separation step, 18.

Representative methods that may be used to capture carbon dioxide in this step include, but are not limited to, physical or chemical sorption, membrane separation, compression/low temperature condensation, adsorption, or any other known technology. Preferred technologies are absorption, such as amine scrubbing or chilled ammonia sorption, condensation, membrane separation, and combinations of these.

Low-temperature or cryogenic condensation and absorption into an amine solution are the most common methods in current industrial use for capturing carbon dioxide and need no detailed description herein. Either method is well suited for use in the present invention. Methods of recovering liquid carbon dioxide by cryogenic condensation or distillation are well known in the art. A preferred process is the well known Ryan-Holmes process, in which a light hydrocarbon liquid or liquid mixture is added to the column to prevent formation of carbon dioxide solids or azeotropes in the column. Various specific techniques for carrying out low temperature condensation are taught, for example in U.S. Pat. Nos. 4,371,381; 4,923,493; 5,233,837. The Ryan-Holmes process is taught in U.S. Pat. Nos. 4,350,511 and 4,462,814, for example.

Methods of recovering carbon dioxide by absorption are also commonly used. In brief, these methods involve absorbing the carbon dioxide into a sorbent solution by physical or chemical interaction, then stripping the gas from the solution and recirculating the regenerated sorbent. Various sorbents may be used; most commonly the sorbent is amine-based and may include a single alkanolamine or a mix of amines. Other sorbents that may be used include chilled ammonia, as in the Alstom process, or other specialized proprietary solvents.

The sorbent solution may be regenerated by steam stripping, and the carbon dioxide recovered from the stripping vapor by cooling and condensing the water. A representative process of this type that may be used is the Fluor Daniel Econamine FG™ process, which uses a monoethanolamine (MEA) based sorbent system. Very detailed descriptions of such processes can be found in the literature, for example in *Gas Purification*, A. Kohl and R. Nielsen (Fifth Edition, Gulf Publishing Co., Houston, Tex., 1997), pages 1188-1237.

It is less preferred to use membrane separation alone for the carbon dioxide capture step as it is hard to reach a high carbon dioxide concentration in the permeate stream without using multiple membrane stages. An example of a three-stage membrane unit for carbon dioxide recovery from natural gas streams is given in U.S. Pat. No. 6,648,944.

Two or more different separation technologies may also be combined in this step; membrane separation may be combined with cryogenic condensation, either upstream or downstream of the condensation step, for example, or gas released in the stripping step of the absorption process may be liquefied by condensation. Examples of such combined processes are taught in U.S. Pat. Nos. 4,639,257; 4,990,168; 5,233,837; and 6,085,549, for example, all of which are incorporated herein by reference.

The third unit operation is membrane separation. Turning to the membrane separation step, 18, as mentioned in the summary section, the membranes used in this step should exhibit high permeance for carbon dioxide, as well as high selectivity for carbon dioxide over nitrogen.

Any membrane with suitable performance properties may be used. Many polymeric materials, especially elastomeric materials, are very permeable to carbon dioxide. Preferred membranes for separating carbon dioxide from nitrogen or other inert gases have a selective layer based on a polyether. A number of such membranes are known to have high carbon dioxide/nitrogen selectivity, such as 30, 40, 50 or above. A representative preferred material for the selective layer is Pebax®, a polyamide-polyether block copolymer material described in detail in U.S. Pat. No. 4,963,165.

The membrane may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a rubbery coating layer that is responsible for the separation properties.

The membranes may be manufactured as flat sheets or as fibers and housed in any convenient module form, including spiral-wound modules, plate-and-frame modules and potted hollow-fiber modules. The making of all these types of membranes and modules is well known in the art. To provide countercurrent flow of the sweep gas stream, the modules preferably take the form of hollow-fiber modules, plate-and-frame modules or spiral-wound modules.

Flat-sheet membranes in spiral-wound modules is the most preferred choice for the membrane/module configuration. A number of designs that enable spiral-wound modules to be used in counterflow mode with or without sweep on the permeate side have been devised. A representative example is described in U.S. Pat. No. 5,034,126, to Dow Chemical.

Membrane step or unit 18 may contain a single membrane module or bank of membrane modules or an array of modules. A single unit or stage containing one or a bank of membrane modules is adequate for many applications. If the residue stream requires further purification, it may be passed to a second bank of membrane modules for a second processing step. If the permeate stream requires further concentration, it may be passed to a second bank of membrane modules for a second-stage treatment. Such multi-stage or multi-step processes, and variants thereof, will be familiar to those of skill in the art, who will appreciate that the membrane separation step may be configured in many possible ways, including single-stage, multistage, multistep, or more complicated arrays of two or more units in serial or cascade arrangements.

Turning to the operating conditions of step 18, the separation of components achieved by the membrane unit depends not only on the selectivity of the membrane for the components to be separated, but also on the pressure ratio.

By pressure ratio, we mean the ratio of total feed pressure/total permeate pressure. In pressure driven processes, it can be shown mathematically that the enrichment of a component (that is, the ratio of component permeate partial pressure/component feed partial pressure) can never be greater than the pressure ratio. This relationship is true, irrespective of how high the selectivity of the membrane may be.

Further, the mathematical relationship between pressure ratio and selectivity predicts that whichever property is numerically smaller will dominate the separation. Thus, if the numerical value of the pressure ratio is much higher than the selectivity, then the separation achievable in the process will not be limited by the pressure ratio, but will depend on the selectivity capability of the membranes. Conversely, if the membrane selectivity is numerically very much higher than the pressure ratio, the pressure ratio will limit the separation. In this case, the permeate concentration becomes essentially independent of the membrane selectivity and is determined by the pressure ratio alone.

High pressure ratios can be achieved by compressing the feed gas to a high pressure or by using vacuum pumps to create a lowered pressure on the permeate side, or a combination of both. However, the higher the selectivity, the more costly in capital and energy it becomes to achieve a pressure ratio numerically comparable with or greater than the selectivity.

From the above, it can be seen that pressure-driven processes using membranes of high selectivity for the components to be separated are likely to be pressure-ratio limited. For example, a process in which a membrane selectivity of 40, 50 or above is possible (such as is the case for many carbon dioxide/nitrogen separations) will only be able to take advantage of the high selectivity if the pressure ratio is of comparable or greater magnitude.

The inventors have overcome this problem and made it possible to utilize more of the intrinsic selective capability of the membrane by diluting the permeate with the sweep gas, stream 21, thereby preventing the permeate side concentration building up to a limiting level.

This mode of operation can be used with a pressure ratio of 1, that is, with no total pressure difference between the feed and permeate sides, with a pressure ratio less than 1, that is, with a higher total pressure on the permeate side than on the feed side, or with a relatively modest pressure ratio of less than 10 or less than 5, for example.

The driving force for transmembrane permeation is supplied by lowering the partial pressure of the desired permeant on the permeate to a level below its partial pressure on the feed side. The use of the sweep gas stream 21 maintains a low carbon dioxide partial pressure on the permeate side, thereby providing driving force.

The partial pressure on the permeate side may be controlled by adjusting the flow rate of the sweep stream to a desired value. In principle the ratio of sweep gas flow to feed gas flow may be any value that provides the desired results, although the ratio sweep gas flow:feed gas flow will seldom be less than 0.1 or greater than 10. High ratios (that is, high sweep flow rate) achieve maximum carbon dioxide removal from the feed, but a comparatively carbon dioxide dilute permeate stream (that is, comparatively low carbon dioxide enrichment in the sweep gas exiting the modules). Low ratios (that is, low sweep flow rate) achieve high concentrations of carbon dioxide in the permeate, but relatively low levels of carbon dioxide removal from the feed.

Use of a too low sweep rate may provide insufficient driving force for a good separation, and use of an overly high sweep flow rate may lead to pressure drop or other problems on the permeate side.

Typically and preferably, the flow rate of the sweep stream should be between about 50% and 200% of the flow rate of the membrane feed stream, and most preferably between about 80% and 120%. Often a ratio of about 1:1 is convenient and appropriate.

The total gas pressures on each side of the membrane may be the same or different, and each may be above or below atmospheric pressure. As mentioned above, if the pressures are about the same, the entire driving force is provided by the sweep mode operation.

In most cases, however, flue gas is available at atmospheric pressure, and the volumes of the streams involved are so large that it is not preferred to use either significant compression on the feed side or vacuum on the permeate side. However, slight compression, such as from atmospheric to 2 or 3 bar, can be helpful and can provide part of a total carbon dioxide capture and recovery process that is relatively energy efficient, as shown in the examples below.

Figure 2:
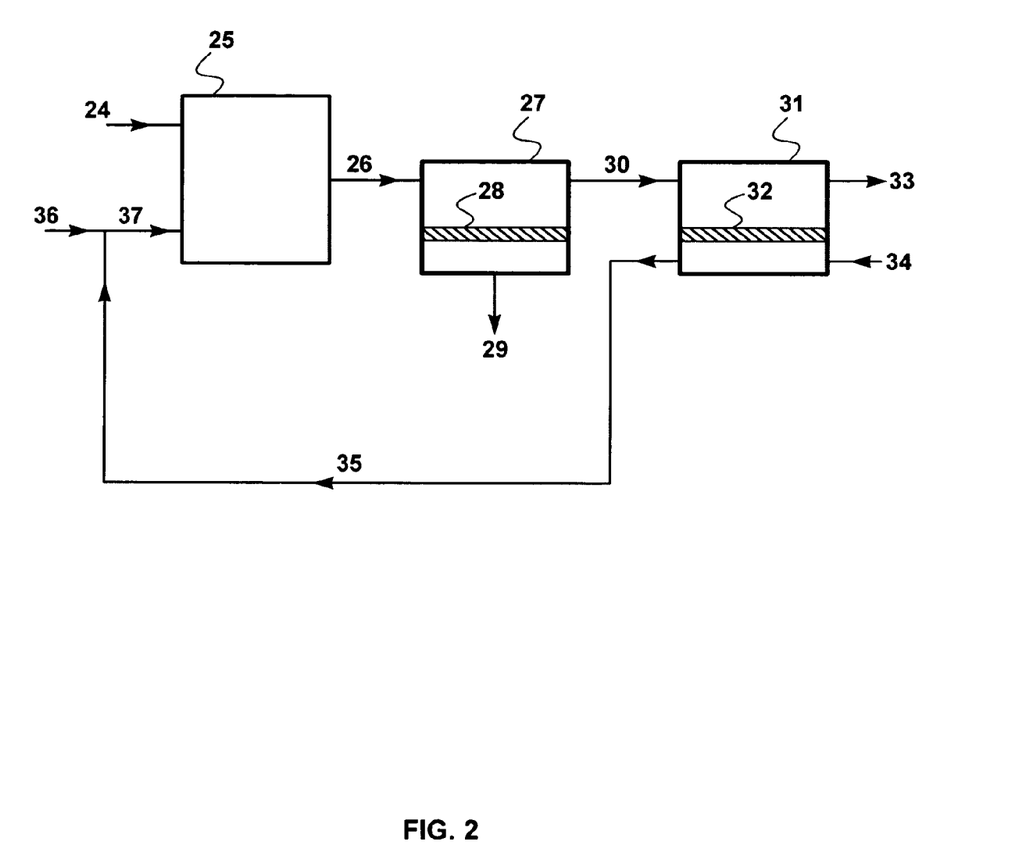
FIG. 2 is a schematic drawing of a flow scheme for an embodiment of the invention in which a membrane separation step is used in the carbon dioxide capture step.

The process in an embodiment in which the carbon dioxide capture step includes membrane separation is shown in FIG. 2. It will be appreciated by those of skill in the art that this, like FIG. 1 and the other flow schemes shown herein, is a very simple block diagram, intended to make clear the key unit operations of the process of the invention, and that an actual process train will usually include many additional steps of a standard type, such as heating, chilling, compressing, condensing, pumping, various types of separation and/or fractionation, as well as monitoring of pressures, temperatures and flows, and the like. It will also be appreciated by those of skill in the art that the details of the unit operations may differ from case to case.

Referring to this figure, fuel, stream 24, and air, oxygen-enriched air or oxygen stream 37, are introduced into a combustor, 25.

Combustion off-gas stream, 26, is sent, at least in part, to the carbon capture step, in this case first membrane separation step or unit, 27. This unit contains membranes, 28, that are selectively permeable to carbon dioxide over nitrogen. This step may be pressure driven, by operating with a higher pressure on the feed side than on the permeate side. This may be achieved by compressing the feed, or more preferably, as the stream is smaller in volume, by pulling a partial vacuum on the permeate side, or by a combination of slight elevation of the feed pressure and slight vacuum on the permeate side.

This step separates the off-gas stream into a carbon dioxide concentrated permeate stream, 29, and a carbon dioxide depleted residue stream, 30. The permeate stream will also typically be rich in water vapor, which may be easily condensed by cooling the stream. Optionally, the permeate stream may then be sent to compression/low-temperature condensation or distillation to form a high purity carbon dioxide product.

Optionally, the driving force in the first membrane separation step may be augmented by using a steam sweep on the permeate side of the membrane. This can provide a significant improvement in the separation achieved in this step, as well as a reduction in energy consumption, since the steam used can be recovered from the permeate gas by simple condensation before the gas enters the vacuum pump.

Residue stream, 30, is passed as feed to second membrane separation unit or step, 31, containing membranes, 32, that are selectively permeable to carbon dioxide over nitrogen and to carbon dioxide over oxygen.

The residue stream flows across the feed side and a sweep gas of air, oxygen-enriched air or oxygen, stream 34, is introduced to the permeate side inlet of the membrane unit and flows across the permeate side, preferably in a flow pattern that is at least partly or substantially countercurrent to the flow pattern on the feed side. The ratio of the inlet flow rates of the feed and sweep streams is most preferably maintained at roughly 1:1, such that the sweep stream flow rate is between about 80% and 120% of the feed flow rate.

The resulting permeate/sweep stream, 35, is withdrawn from the membrane unit and is combined with stream 36 to feed to the combustor. Optionally, stream 36 may be omitted and the entirety of the oxygen-containing stream may be provided by the sweep stream.

The residue stream, 33, is depleted in carbon dioxide and is discharged from the process. By following the teachings of the invention, it is possible to reduce the carbon dioxide concentration of the discharged off-gas by at least 80%, 90%, or more compared with the concentration in the raw flue gas. For example, the off-gas from the combustor may contain 20% carbon dioxide and the residue vent gas may contain only 1 or 2% carbon dioxide.

Such a high level of carbon dioxide removal is practically impossible with processes that are purely pressure driven, as the energy requirements to operate the process and the membrane area needed to reach the desired levels of carbon dioxide permeation are excessive.

The process is now described in more detail as it relates to a specific preferred embodiment for treating flue gas from a power plant, such as a coal-fired power plant. In this representative process, the carbon capture step is assumed to be made up of a membrane separation stage, which is similar in function to membrane separation step 27 in FIG. 2, plus a third membrane separation step and a carbon dioxide recovery step that yields a liquid or supercritical fluid purified carbon dioxide product. The third membrane separation step and the product recovery step may be carried out with the membrane separation step preceding the product recovery step or vice versa.

Figure 3:
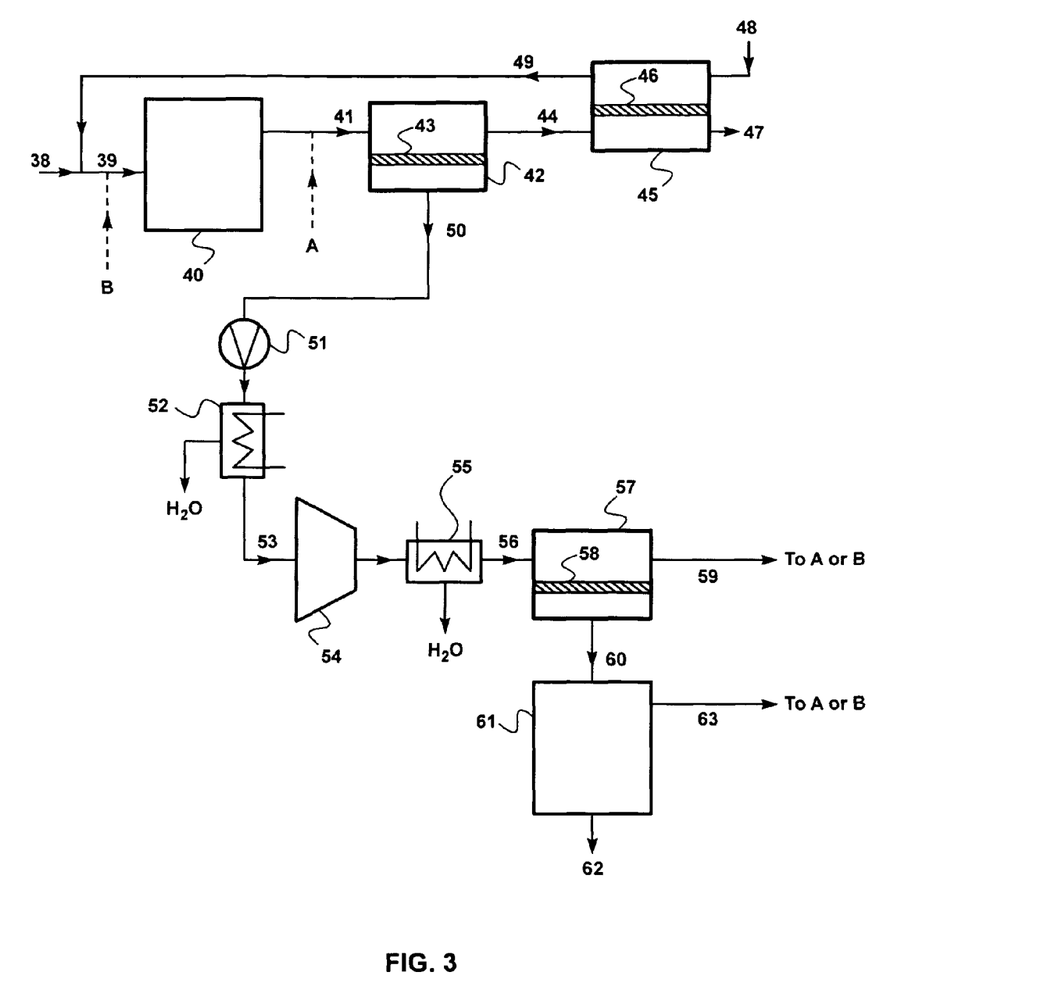

A process in which the membrane separation step precedes a liquefaction step for product recovery is shown schematically in FIG. 3. Referring to this figure, flue gas stream, 41, emanates from the combustors of a power plant, 40, which is fed by stream 39, made up of fuel stream, 38, and air stream, 49. In most coal- or gas-fired power plants, the pressure of this flue gas is just above atmospheric, such as 1.1 or 1.2 bar absolute. However, in some processes, for example, combustion of natural gas for an electric power generation turbine, the flue gas pressure may be higher, such as 2-10 bar.

The flue gas passes to the first section of the carbon capture step, specifically first membrane separation step, 42. The step is carried out using membranes, 43, having carbon dioxide permeance and selectivity characteristics as described above.

This step separates the flue gas into a carbon dioxide depleted residue stream, 44, usually containing less than about 10% carbon dioxide, and a carbon dioxide enriched permeate stream, 50, usually containing at least about 40% carbon dioxide.

In deciding the operating conditions for the membrane separation step, there exists a trade-off between the amount of membrane area required for the separation and the energy consumption to operate the process. In this representative and preferred example, the driving force for transmembrane permeation in this step is shown as being provided by a vacuum pump or train of vacuum pumps, 51, on the permeate side of the first membrane step. The vacuum pumps maintain a pressure down to about 0.1 bar, such as 0.5 bar or 0.2 bar on the permeate side.

The pressure difference across the membrane generated by the vacuum pumps) is small, so the membrane areas required to achieve the separation required are very large. However, the permeate gas stream passing through the vacuum pump has only a fraction of the volume of the flue gas, so the power used by the vacuum pump is smaller than the power that would be consumed by a compression train operating on the feed gas.

Alternative preferred representative embodiments within the scope of the invention use modest compression of the feed stream, either alone or in conjunction with pulling a slight vacuum on the permeate side. An embodiment with slight feed compression is preferred, for example, in the case of a coal-fired power plant where the flue gas is at 1.1 bar absolute. This gas may be compressed to up to about 5 bar, such as 2 or 3 bar, and a portion of the energy used for the compressors may be recovered by expanding the final treated flue gas stream, 47, in a turbine before final discharge. The use of connected compressor/turbo-expander operations for energy recovery is well known in the art and in power plants in particular.

Aftercooler, 52, knocks out water that has permeated the membranes with the carbon dioxide.

The remaining permeate gas stream, 53, then passes through a compressor or compression train, 54, where it is compressed to a few bar pressure, such as 3 or 4 bar, and then through aftercooler, 55, where additional water is knocked out. The compressed gas forms the feed stream, 56, to the second membrane separation stage, 57, containing membranes, 58, having similar characteristics to those described previously. The permeate stream, 60, from this stage typically contains more than 80% carbon dioxide, and is sent to a cryogenic liquefaction plant, 61, to produce liquefied carbon dioxide product, 62.

The off-gases, 63, from the liquefaction plant, which are mostly nitrogen and oxygen, but which also may contain up to 10, 15 or 20% carbon dioxide, may be returned to the front of the flue gas treatment train at position A as shown, may be returned to the combustor at position B as shown, or may be recirculated, used or discharged in any other desired fashion. Likewise, the residue stream, 59, from the second-stage membrane unit may be returned to the process at position A or B, or sent elsewhere as desired.

The residue gas stream, 44, leaving the first membrane unit normally contains up to about 10% carbon dioxide. This gas passes as feed to the sweep-driven membrane separation step or unit, 45. This step uses membranes, 46, having similar characteristics to those described previously. The feed air, 48, to the power plant burner passes as a sweep gas on the other side of the membranes. Carbon dioxide permeates preferentially through the membranes and is returned with the feed air to the burner in permeate/sweep stream, 49.

The treated flue gas stream, 47, is vented.

The embodiment described above with respect to FIG. 3 is intended to be illustrative of a typical flue gas treatment process and is not intended to limit the scope of the invention. Those of skill in the art will appreciate how to practice the invention as it applies to other combustion processes by following the teachings herein.

Figure 4:
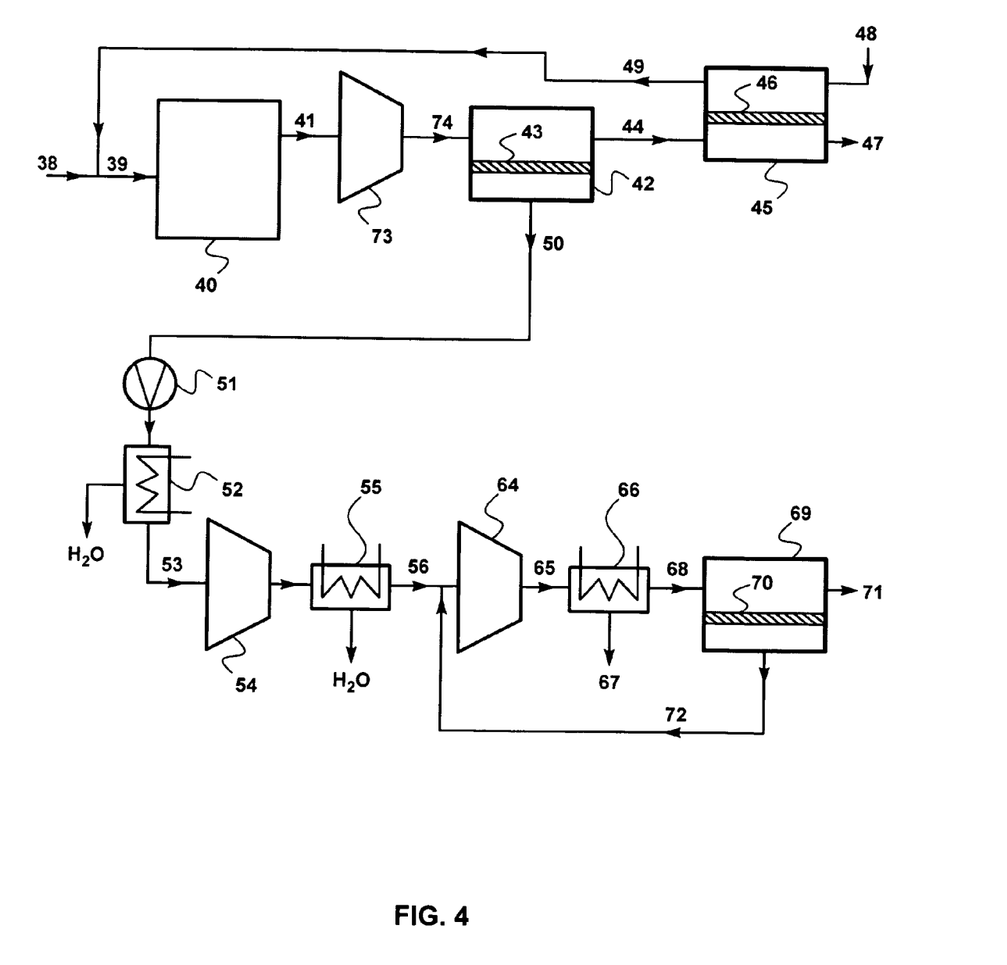

For example, a representative variant of the embodiment of FIG. 3 is shown in FIG. 4, in which like elements are numbered as in FIG. 3. The process of FIG. 3 differs from that of FIG. 4 in that some compression, 73, is used to create a compressed feed stream, 74, at 2 or 3 bar, which forms the feed to membrane separation step, 42.

This design also differs from that of FIG. 3 in the manner in which the compressed gas stream, 56, is processed. In FIG. 3, the stream passes to a membrane separation step, 57, and thence to the liquefaction plant. In FIG. 4, the membrane step is used instead to treat the off-gas from the liquefaction unit, so that the product recovery step precedes the last membrane separation step. Thus, stream 56 enters compression step or train, 64, where the pressure is raised to a suitable pressure for liquefaction, such as 20, 30, 40 bar or above, then passes as compressed stream, 65, to the condensation steps, 66. Here the gas is condensed/distilled at low temperature, typically by heat exchange against propylene or other low-temperature refrigerant, to produce carbon dioxide product stream, 67. The overhead stream, 68, from the carbon dioxide recovery column, is sent to membrane separation step, 69, containing membranes, 70, having similar characteristics to those described previously. The driving force for transmembrane permeation in this membrane unit is provided by the high pressure of the column overhead. The permeate stream, 72, is enriched in carbon dioxide and is recirculated at a suitable point to the compression train for the liquefaction steps, as indicated in the figure, or may be returned elsewhere in the process.

The membrane residue stream, 71, may be returned to the combustor, to the flue gas treatment train before or after compression step 73, or may be used or discharged elsewhere as desired.

The invention is now further described by the following examples, which are intended to be illustrative of the invention, but are not intended to limit the scope or underlying principles in any way.

EXAMPLES

Example 1

Bases of Calculations for Other Examples (a) Membrane permeation experiments: A set of permeation experiments was performed with a composite membrane having a polyether-based selective layer. The properties of the membrane as measured with a set of pure gases at 6.7 bar absolute and 30° C. are shown in Table 1.

TABLE 1

| Gas | Permeance (gpu)* | $CO_2$/Gas Selectivity |
|---|---|---|
| Carbon dioxide | 1,000 | — |
| Nitrogen | 20 | 50 |
| Oxygen | 50 | 20 |
| Methane | 50 | 20 |
| Water | >2,000** | — |

*Gas permeation unit; 1 gpu = $1 \times 10^{-6}$ cm$^3$(STP)/cm$^2$ · s · cmHg
**Estimated, not measured (b) Assumptions concerning power plant: All calculations were performed assuming that the flue gas to be treated was from a 600 MW gross power coal-fired power plant. It was assumed that the exhaust gas is filtered to remove fly ash and other particulate matter before passing to the membrane separation steps.

The assumed compositions of the coal and air feed, and the calculated composition of the flue gas based on conventional combustion are shown in Table 2.

(c) Calculation methodology: All calculations were performed with a modeling program, ChemCad 5.5 (ChemStations, Inc., Houston, Tex.), containing code for the membrane operation developed by MTR's engineering group, For the calculations, all compressors and vacuum pumps were assumed to be 75% efficient. In each case, the modeling calculation was performed to achieve 90% recovery of carbon dioxide from the flue gas stream.

TABLE 2

| Component/Parameter | Air feed | Coal feed | Flue gas |
|---|---|---|---|
| Flow rate(MMscfd) | 1,400 | | 1,500 |
| Flow rate (thousand kg/h) | | 165 | |
| Pressure (bar) | 1.0 | | 1.0 or 1.1 |
| Component (mol %) | | | |
| Carbon dioxide | | | 11.6 |
| Oxygen | 21 | 1.5 | 4.3 |
| Nitrogen | 79 | 0.6 | 73.8 |
| Water | | 9.5 | 10.2 |
| Hydrogen | | 36.5 | |
| Carbon | | 51.9 | |
| Component (thousand kg/h) | | | |
| Carbon dioxide | | | 403 |
| Oxygen | 495.2 | 9 | 108 |
| Nitrogen | 1631 | 3 | 1,634 |
| Water | | 30 | 146 |
| Hydrogen | | 13 | |
| Carbon | | 110 | |

Example 2

Not in Accordance with the Invention

A calculation was performed to illustrate the treatment of the flue gas by membrane separation without using a sweep gas on the permeate side. It was assumed that the flue gas was (i) compressed to 9 bar, (ii) cooled to 30° C., and (iii) subjected to membrane separation using only the total pressure difference and ratio to achieve the separation. The permeate side of the membranes was assumed to be maintained at 1 bar.

Part of the compression requirement was assumed to be met by expanding the membrane residue stream back to 1 bar before discharge.

The results of the calculations are shown in Table 3.

TABLE 3

| Component/Parameter | Raw flue gas | Membrane feed | Membrane residue/ vent gas | Membrane permeate |
|---|---|---|---|---|
| Flow rate(MMscfd) | 1,500 | 1,354 | 970 | 384 |
| Flow rate (thousand kg/h) | 2,293 | 2,151 | 1,453 | 698 |
| Temperature (° C.) | 50 | 30 | 29 | 20 |
| Pressure (bar) | 1.0 | 9 | 9 | 957 |
| Component (mol %) | | | | |
| Carbon dioxide | 11.6 | 12.7 | 1.8 | 40.3 |
| Oxygen | 4.3 | 4.7 | 4.2 | 5.9 |
| Nitrogen | 73.8 | 82.2 | 94.0 | 52.2 |
| Water | 10.2 | 0.4 | 0.0 | 1.5 |

As can be seen, most of the water in the raw flue gas is knocked out by the cooling after the compression step. The process produces a stack gas containing 1.8 vol % carbon dioxide, and cuts atmospheric carbon dioxide emissions by 90%, from 174 MMscfd to 17 MMscfd.

The calculated membrane area and net compression energy required were as follows:

Membrane area: 580,000 m$^2$

Total compression energy=220 MW

Energy supplied by turbo-expander=99 MW

Net compression energy=121 MW.

The net energy used by the process is about 21% of the 600 MW of power produced by the plant.

The permeate gas contains about 40 mol % carbon dioxide. To further concentrate and purify the carbon dioxide by compression/low temperature condensation would require about 90 MW of power. Thus, the total energy cost of the treatment train is about over 200 MW, or about one-third of the total output of the power plant.

Example 3

Not in Accordance with the Invention

A second calculation was performed to illustrate the treatment of the flue gas by membrane separation without using a sweep gas on the permeate side. This time it was assumed that the flue gas was passed across the feed side without compression, but after cooling to 30° C., and that a vacuum of 0.2 bar was pulled on the permeate side of the membranes.

The results of the calculations are shown in Table 4.

TABLE 4

| Component/Parameter | Raw flue gas | Membrane feed | Membrane residue/ vent gas | Membrane permeate |
|---|---|---|---|---|
| Flow rate(MMscfd) | 1,500 | 1,403 | 865 | 539 |
| Flow rate (thousand kg/h) | 2,293 | 2,202 | 1,294 | 907.6 |
| Temperature (° C.) | 50 | 30 | 29 | 29 |
| Pressure (bar) | 1.1 | 1.1 | 1.1 | 0.2 |
| Component (mol %) | | | | |
| Carbon dioxide | 11.6 | 12.4 | 2.0 | 29.1 |
| Oxygen | 4.3 | 4.5 | 3.7 | 5.7 |
| Nitrogen | 73.8 | 79.2 | 93.7 | 56.0 |
| Water | 10.2 | 3.9 | 0.5 | 9.2 |

The process again achieves 90% carbon dioxide removal, from 174 to 17 MMscfd in the discharged flue gas, and cuts the concentration of carbon dioxide in the exhaust stream to 2 vol %.

The calculated membrane area and net vacuum pump energy required were as follows:

Membrane area: 7.7 million m$^2$

Total compression energy: 56 MW

The membrane area requirement of 7.7 million m$^2$ is very large, but the energy requirement is low compared with Example 3, so that the process uses only 9% of the energy produced by the plant.

As can be seen, however, this process produces a very dilute carbon dioxide product (29 vol %) compared with the carbon dioxide product (40 vol %) from Example 3. The energy required to recover carbon dioxide from this stream as a supercritical fluid or liquid is about 180 MW, raising the total energy requirement to capture carbon dioxide to almost 40% of the power produced by the power plant.

Example 4

Process of the Invention

A calculation was performed to illustrate the treatment of the flue gas from a coal-fired power plant by membrane separation, according to the embodiment of FIG. 3. The assumptions for the gas composition and the membrane performance were as in Example 1. The assumptions for the coal feed were as shown in Table 2 of Example 1.

It was assumed that the vacuum pump, 51, provided a vacuum of 0.2 bar on the permeate side of the membranes in step 42, and that the permeate stream was compressed to 3.5 bar in compression step 54 before passing to membrane unit or step 57. As in Example 2, it was assumed that part of the compression energy to drive compression step 54 was supplied by expanding the membrane residue stream back to 1.1 bar before returning the stream to the front of the process at position A.

The results of the calculation are shown in Table 5.

| | Parameter | | | | | | | | | |
|---|---|---|---|---|---|---|---|---|---|---|
| Component | 41 Flue gas from combustor | 44 | 47 Vent gas | 48 | 49 | 50 | 59 | 60 | 62 Liquid product | 63 |
| Flow rate(MMscfd) | 1,658 | 1,328 | 1,192 | 1,400 | 1,537 | 330 | 78 | 174 | — | 14 |
| Flow rate (thousand kg/h) | 2,648 | 2,054 | 1,789 | 2,131 | 2,397 | 593 | 127 | 390 | 359 | 23 |
| Temperature (° C.) | 54 | 54 | 50 | 50 | 53 | 54 | 132 | 133 | | 30 |

-continued

| Component | 41 Flue gas from combustor | 44 | 47 Vent gas | 48 | 49 | 50 | 59 | 60 | 62 Liquid product | 63 |
|---|---|---|---|---|---|---|---|---|---|---|
| Pressure (bar) | 1.1 | 1.1 | 1.1 | 1.0 | 1.0 | 0.2 | 3.5 | 1.0 | | 1.0 |
| | | | | Component (mol %) | | | | | | |
| Carbon dioxide | 18.4 | 9.8 | 1.5 | 0 | 7.3 | 53 | 20 | 91.2 | 100 | 20 |
| Oxygen | 1.9 | 2.1 | 5.4 | 21 | 16.7 | 1.2 | 3.6 | 0.7 | — | 8.6 |
| Nitrogen | 72.1 | 84.9 | 93 | 79 | 73.2 | 21 | 76 | 5.7 | — | 71.2 |
| Water | 7.6 | 3.3 | .01 | 0 | 2.8 | 25 | 0.3 | 2.3 | — | 0 |

The calculated membrane area and net compression energy required were as follows:
Membrane area unit 42=1.8 million m$^2$
Membrane area unit 45=2.2 million m$^2$
Membrane area unit 57=12,000 m$^2$ Total membrane area=4.1 million m$^2$
Total compression energy (including compression within liquefaction plant): 85 MW
Energy supplied by turbo-expander: 3 MW
Refrigeration energy: 11 MW
Total net energy: 93 MW.
By using the process of the invention, the total energy requirement for carbon dioxide capture is reduced to 93 MW, about 15% of the total energy output of the plant.

Example 5

Process of the Invention

A calculation similar to that of Example 4 was performed to illustrate the treatment of the flue gas from a coal-fired power plant by membrane separation, according to the embodiment of FIG. 4. In this scheme, a vacuum pump, 51, is used in the permeate line, 50, of the first membrane step, 42. This cross flow membrane unit only removes a portion of the CO$_2$ in flue gas in a single pass, to reduce the membrane area and energy required in this step.

The residue gas, 44, leaving the cross flow membrane step still contains 7.4% carbon dioxide. This gas is further treated in second membrane step, 45, which has a countercurrent/sweep configuration. Feed air, 48, to the boiler passes on the permeate side of this membrane unit as a sweep stream.

The permeate gas leaving the second pump section, 54, is sent to a compression-condensation-membrane loop for liquefaction. Stream 71 was assumed to be recirculated to join flue gas stream 41.

The results of the calculation are shown in Table 6.

TABLE 6

| Parameter | 41 Flue gas from combustor | 74 | 50 | 44 | 48 | 49 | 47 Vent gas | 54 | 67 Liquid product | 71 |
|---|---|---|---|---|---|---|---|---|---|---|
| Pressure (bar) | 1.0 | 2.6 | 0.14 | 2.5 | 1.0 | 1.0 | 1.0 | 10 | 35 | 1.0 |
| Flow rate (MMscfd) | 1,510 | 1,410 | 260 | 1,150 | 1,300 | 1,390 | 1,060 | 214 | 170 | 44 |
| | | | | Component (vol %) | | | | | | |
| Carbon dioxide | 18 | 19 | 68 | 7.4 | — | 4.7 | 1.8 | 83 | 99.7 | 20 |
| Nitrogen | 68 | 73 | 13 | 87 | 79 | 75 | 92 | 16 | — | 71.1 |
| Oxygen | 4 | 4.3 | 1.5 | 4.9 | 21 | 19 | 6.2 | 0.2 | — | 8.9 |
| Water | 10 | 3.7 | 17.5 | 0.7 | — | — | — | 0.2 | 0.3 | — |

The process uses 12% of generated power to separate carbon dioxide from flue gas, with an additional 4-7% required for carbon dioxide compression-condensation-membrane separation in the liquefaction loop. The total energy usage is thus about 16-19% of the total power output of the power plant.

We claim:
1. A process for controlling carbon dioxide exhaust from combustion processes, comprising:
   (a) performing a combustion process by combusting a mixture of a fuel and air, oxygen-enriched air or oxygen, thereby creating an exhaust stream comprising carbon dioxide and nitrogen;
   (b) performing a carbon dioxide capture step to remove a portion of carbon dioxide in concentrated form from the exhaust stream, thereby creating an off-gas stream from the capture step that is less concentrated in carbon dioxide than the exhaust stream;
   (c) providing a membrane having a feed side and a permeate side, and being selectively permeable to carbon dioxide over nitrogen and to carbon dioxide over oxygen;
   (d) passing at least a portion of the off-gas stream across the feed side;
   (e) passing air, oxygen-enriched air or oxygen as a sweep stream across the permeate side;
   (f) withdrawing from the feed side a carbon-dioxide depleted vent stream;

(g) withdrawing from the permeate side a permeate stream comprising oxygen and carbon dioxide;
(h) passing the permeate stream to step (a) as at least part of the air, oxygen-enriched air or oxygen used in step (a).

2. The process of claim 1, wherein the exhaust stream comprises flue gas from a coal-fired or gas-fired power plant.

3. The process of claim 1, wherein the carbon dioxide capture step comprises at least one process selected from the group consisting of absorption, adsorption, liquefaction and membrane separation.

4. The process of claim 1, wherein the carbon dioxide capture step comprises membrane separation.

5. The process of claim 1, wherein the membrane exhibits a carbon dioxide permeance of at least 500 gpu under process operating conditions.

6. The process of claim 1, wherein the membrane exhibits a selectivity in favor of carbon dioxide over nitrogen of at least 10 under process operating conditions.

7. The process of claim 1, wherein the vent stream contains less than 5 vol % carbon dioxide.

8. The process of claim 1, wherein the off-gas stream is compressed to a pressure up to about 5 bar before being passed across the feed side.

9. A process for controlling carbon dioxide exhaust from combustion processes, comprising:
(a) performing a combustion process by combusting a mixture of a fuel and air, oxygen-enriched air or oxygen, thereby creating an exhaust stream comprising carbon dioxide and nitrogen;
(b) providing a first membrane having a first feed side and a first permeate side, and being selective for carbon dioxide over nitrogen;
(c) maintaining a driving force for transmembrane permeation;
(d) passing at least a portion of the exhaust stream across the first feed side;
(e) withdrawing from the first feed side a first residue stream depleted in carbon dioxide compared with the exhaust stream;
(f) withdrawing from the first permeate side a first permeate stream comprising carbon dioxide;
(g) providing a second membrane having a second feed side and a second permeate side, and being selectively permeable to carbon dioxide over nitrogen and to carbon dioxide over oxygen;
(h) passing at least a portion of the first residue stream across the second feed side;
(i) passing air, oxygen-enriched air or oxygen as a sweep stream across the second permeate side;
(j) withdrawing from the second feed side a carbon-dioxide depleted vent stream;
(k) withdrawing from the second permeate side a second permeate stream comprising oxygen and carbon dioxide;
(l) passing the second permeate stream to step (a) as at least part of the air, oxygen-enriched air or oxygen used in step (a).

10. The process of claim 9, further comprising passing the first permeate stream to a carbon dioxide liquefaction step.

11. The process of claim 9, wherein the driving force for transmembrane permeation is provided at least in part by maintaining the first permeate side under a partial vacuum by means of a vacuum pump through which the first permeate stream is withdrawn in step (f).

12. The process of claim 11, wherein the exhaust stream further comprises water vapor, and wherein the first permeate stream is enriched in water vapor compared with the exhaust stream, and the first permeate stream is cooled to condense water before step (f).

13. The process of claim 11, wherein the exhaust stream further comprises water vapor, and wherein at least part of the water vapor is added to the exhaust stream to facilitate step (c).

14. The process of claim 11, wherein the driving force for transmembrane permeation is provided at least in part by sweeping the first permeate side with steam.

15. A process for removing carbon dioxide from a power plant flue gas stream, comprising:
(a) performing a first membrane separation step by;
(i) providing a first membrane unit containing a first membrane having a first feed side and a first permeate side;
(ii) providing a first driving force for transmembrane permeation by maintaining the first permeate side under a partial vacuum;
(iii) passing the flue gas stream across the first feed side;
(iv) withdrawing from the first feed side a carbon-dioxide-depleted first residue stream;
(v) withdrawing from the first permeate side a carbon-dioxide-enriched first permeate stream;
(b) compressing the first permeate stream;
(c) cooling the first permeate stream thereby condensing water to provide a compressed, cooled first permeate stream;
(d) performing a combination of a second membrane separation step and a liquefaction step to form a liquid carbon dioxide product, wherein the second membrane separation step is performed by;
(i) providing a second membrane unit containing a second membrane having a second feed side and a second permeate side;
(ii) providing a second driving force for transmembrane permeation;
(iii) withdrawing from the second feed side a carbon-dioxide-depleted second residue stream;
(iv) withdrawing from the second permeate side a carbon-dioxide-enriched second permeate stream;
(e) performing a third membrane separation step by;
(i) providing a third membrane unit containing a third membrane having a third feed side and a third permeate side, and being selectively permeable to carbon dioxide over nitrogen;
(ii) passing at least a portion of the first residue stream across the third feed side;
(iii) passing air as a sweep stream across the third permeate side;
(iv) withdrawing from the third feed side a treated flue gas stream;
(v) withdrawing from the third permeate side a third permeate stream comprising oxygen and carbon dioxide;
(f) using the third permeate stream as an air supply stream for a combustor in the power plant.

16. The process of claim 15, wherein the liquefaction step precedes the second membrane separation step so that an overhead stream from the liquefaction step is treated by the second membrane separation step.

17. The process of claim 15, wherein the second membrane separation step precedes the liquefaction step so that a second permeate stream from the second membrane separation step is sent to the liquefaction step.

18. The process of claim 15, wherein the treated flue gas stream contains less than 5 vol % carbon dioxide.

19. The process of claim 15, wherein the flue gas stream is compressed to a pressure up to about 5 bar before being passed across the first feed side.

20. The process of claim 15, wherein the first permeate side is maintained under a vacuum down to about 0.1 bar.

* * * * *